United States Patent
Tomimatsu et al.

(10) Patent No.: US 9,446,352 B2
(45) Date of Patent: Sep. 20, 2016

(54) ATMOSPHERE-CLEANING DEVICE FOR VEHICLES

(71) Applicants: Makoto Tomimatsu, Susono (JP); Koichi Hoshi, Susono (JP); Yoshihisa Shinoda, Susono (JP); Kazuhiro Sugimoto, Susono (JP); Takuya Ookubo, Susono (JP)

(72) Inventors: Makoto Tomimatsu, Susono (JP); Koichi Hoshi, Susono (JP); Yoshihisa Shinoda, Susono (JP); Kazuhiro Sugimoto, Susono (JP); Takuya Ookubo, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/442,194

(22) PCT Filed: Nov. 14, 2012

(86) PCT No.: PCT/JP2012/079515
§ 371 (c)(1),
(2) Date: May 12, 2015

(87) PCT Pub. No.: WO2014/076780
PCT Pub. Date: May 22, 2014

(65) Prior Publication Data
US 2015/0343379 A1 Dec. 3, 2015

(51) Int. Cl.
*B01D 53/88* (2006.01)
*B01D 53/86* (2006.01)

(52) U.S. Cl.
CPC ....... *B01D 53/8675* (2013.01); *B01D 53/8696* (2013.01); *B01D 53/88* (2013.01);
(Continued)

(58) Field of Classification Search
CPC .............. B01D 53/88; B01D 53/8675; B01D 53/8696

USPC ................ 422/111, 120, 122; 55/481, 285.3; 60/277; 180/54.1
See application file for complete search history.

(56) References Cited

U.S. PATENT DOCUMENTS 4,101,296 A * 7/1978 Lowther ................ B01D 53/66
423/219
5,158,654 A * 10/1992 Yoshimoto ......... B01D 53/8675
204/252
(Continued)

FOREIGN PATENT DOCUMENTS

EP 1233829 B1 9/2005
JP H04-121426 U 10/1992
(Continued)

OTHER PUBLICATIONS

Tomiyasu Shimoyamada "Fundamental Study of Manganese Dioxide for Catalytic Recombustion of Exhaust Gas of Motor Car", Fukushima National College of Technology, vol. 10, No. 1 (1974), pp. 32-38. (Specification) (English abstract provided).
(Continued)

*Primary Examiner* — Huy-Tram Nguyen
(74) *Attorney, Agent, or Firm* — Kenyon & Kenyon LLP

(57) ABSTRACT

An object of this invention is to provide an atmosphere-cleaning device for vehicles that is capable of restoring the function of an ozone purifying body carried by a vehicle component. Mud, dust, snow-melting agents as well as SOx and NOx are scattered into the atmosphere as a result of being swirled up by a preceding vehicle or due to weather and climate conditions. When such extraneous substances adhere or the like to an ozone purifying body, the purification sites thereof are clogged and the ozone purification function deteriorates. Therefore, when a predetermined removal implementation condition is established, control is executed to inject cleaning liquid from an injector to enhance the fluidity of the extraneous substances and wash the extraneous substances away. The function of the ozone purifying body can thereby be restored.

17 Claims, 15 Drawing Sheets

(52) U.S. Cl.
CPC ... *B01D2253/102* (2013.01); *B01D 2253/108* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/50* (2013.01); *B01D 2255/702* (2013.01); *B01D 2257/106* (2013.01); *B01D 2258/06* (2013.01); *B01D 2259/4566* (2013.01)

(56) References Cited

U.S. PATENT DOCUMENTS

| | | | |
|---|---|---|---|
| 6,214,303 | B1 | 4/2001 | Hoke et al. |
| 6,340,066 | B1 | 1/2002 | Dettling et al. |
| 6,517,899 | B1 | 2/2003 | Hoke et al. |
| 6,569,393 | B1 * | 5/2003 | Hoke ............... B01D 53/864 |
| | | | 423/219 |
| 6,849,177 | B2 | 2/2005 | Murata et al. |
| 7,473,402 | B2 | 1/2009 | Michalakos et al. |
| 2001/0021363 | A1 | 9/2001 | Poles et al. |
| 2001/0031693 | A1 | 10/2001 | Hoke et al. |
| 2002/0018742 | A1 | 2/2002 | Hoke et al. |
| 2002/0074174 | A1 | 6/2002 | Dettling et al. |
| 2003/0056496 | A1 * | 3/2003 | Ueno ............... F01N 3/0835 |
| | | | 60/277 |
| 2003/0166466 | A1 | 9/2003 | Hoke et al. |
| 2005/0100492 | A1 | 5/2005 | Hoke et al. |
| 2005/0123455 | A1 * | 6/2005 | Inaba ............... A61L 9/015 |
| | | | 422/120 |
| 2007/0125520 | A1 | 6/2007 | Nutsos |

FOREIGN PATENT DOCUMENTS

| | | |
|---|---|---|
| JP | 2002-514966 A | 5/2002 |
| JP | 2004-132277 A | 4/2004 |
| JP | 2007-508997 A | 4/2007 |
| JP | 2010-029816 A | 2/2010 |
| JP | 2010-112355 A | 5/2010 |

OTHER PUBLICATIONS

Young-Whan Lee, et al., "Adsorption and reaction behavior for the simultaneous adsorption of NO—NO2 and SO2 on activated carbon impregnated with KOH", Carbon 41 (2003), pp. 1881-1888. (Specification).

N. Shirahama, et al., "Mechanistic study on adsorption and reduction of NO2 over activated carbon fibers", Carbon 40 (2002), pp. 2605-2611. (Specification).

Hassan A. Arafat, et al., "Effect of Salt on the Mechanism of Adsorption of Aromatics on Activated Carbon", Langmuir, vol. 15, No. 18 (1999), pp. 5997-6003. (Specification).

* cited by examiner

110 RADIATOR SURFACE TEMPERATURE > α?
120 INJECT CLEANING LIQUID
130 OZONE PURIFICATION RATE < β?

210 RADIATOR SURFACE TEMPERATURE > $\alpha$?
220 PURIFICATION DECLINE RATE > $\varepsilon 0$?
230 OZONE PURIFICATION RATE < $\beta$?
240 PURIFICATION DECLINE RATE < $\varepsilon 1$?
250 DIVIDED INJECTION (MAIN INJECTION PROPORTION CHANGED)
260 NORMAL INJECTION
270 DIVIDED INJECTION (MAIN INJECTION PROPORTION CONSTANT)

310 STOP CONDITION ESTABLISHED?
320 ROTATE FANS IN REVERSE
330 INJECT CLEANING LIQUID

ATMOSPHERE-CLEANING DEVICE FOR VEHICLES

CROSS-REFERENCE TO RELATED APPLICATION

This is a national phase application based on the PCT International Patent Application No. PCT/JP2012/079515 filed Nov. 14, 2012, the entire contents of which are incorporated herein by reference.

TECHNICAL FIELD

The present invention relates to an atmosphere-cleaning device for vehicles, and more particularly to an atmosphere-cleaning device that can purify ozone contained in atmospheric air.

BACKGROUND ART

Ozone that causes photochemical smog is generated as a result of HC and NOx that are contained in exhaust gas of automobiles and factories causing a photochemical reaction. Therefore, suppressing ozone generation by reducing emissions of HC and NOx from automobiles is an effective way of preventing the occurrence of photochemical smog. On the other hand, direct purification of ozone in atmospheric air is also a conceivable method for preventing the occurrence of photochemical smog. It is possible to prevent the occurrence of photochemical smog more effectively by not only aiming at reducing emissions of HC and NOx as reactants, but also trying to purify ozone that is a product. Against this background, automobiles provided with an atmosphere-cleaning device for vehicles that enables direct purification of ozone in atmospheric air have been put into practical use in some regions, such as California in the United States. The aforementioned atmosphere-cleaning device for vehicles is referred to, in particular, as a "direct ozone reduction (DOR) system".

For instance, as a DOR system, Patent Literature 1 discloses a system in which a metal oxide such as manganese dioxide is carried by a vehicle component such as a radiator or an intercooler. The radiator or intercooler is installed at a location at which a flow path of atmospheric air is formed while the vehicle is travelling. The metal oxide such as manganese dioxide is an ozone purifying body having a function of purifying the ozone present in atmospheric air by converting the ozone into another substance such as oxygen. Therefore, according to the DOR system disclosed in Patent Literature 1, ozone present in atmospheric air can be directly purified while the vehicle is travelling.

CITATION LIST

Patent Literature

Patent Literature 1: Japanese Publication of International Patent Application No. 2002-514966
Patent Literature 2: Japanese Patent Laid-Open No. 2004-132277
Patent Literature 3: Japanese Patent Laid-Open No. 2010-112355
Patent Literature 4: U.S. Pat. No. 7,473,402
Patent Literature 5: U.S. Pat. No. 6,849,177
Patent Literature 6: European Patent No. 1233829
Patent Literature 7: Japanese Patent Laid-Open No. 2010-29816
Patent Literature 8: Japanese Utility Model Laid-Open No. 4-121426
Patent Literature 9: Japanese Publication of International Patent Application No. 2007-508997

Non Patent Literature

Non Patent Literature 1: "Fundamental Study of Manganese Dioxide for Catalytic Recombustion of Exhaust Gas of Motor Car [in Japanese]", Fukushima National College of Technology, Vol. 10, No. 1, 1974
Non Patent Literature 2: Young-Whan Lee, et al. "Adsorption and reaction behavior for the simultaneous adsorption of NO—$NO_2$ and $SO_2$ on activated carbon impregnated with KOH", Carbon 41, 2003, 1881-1888
Non Patent Literature 3: N. Shirahama, et al. "Mechanistic study on adsorption and reduction of $NO_2$ over activated carbon fibers", Carbon 40, 2002, 2605-2611
Non Patent Literature 4: Hassan A. Arafat, et al. "Effect of Salt on the Mechanism of Adsorption of Aromatics on Activated Carbon", Langmuir, Vol. 15, No. 18, 1999, 5997-6003

SUMMARY OF INVENTION

In this connection, it is known that the above described ozone purification function is exhibited not only by a metal oxide such as manganese dioxide, but also by a porous material such as activated charcoal or zeolite. However, the function of these ozone purifying bodies deteriorates due to the influence of mud, dust, snow-melting agents (chlorides such as NaCl and $CaCl_2$) and the like. This is because these extraneous substances adhere to and accumulate on the ozone purifying bodies, and as a result purification sites are physically clogged. Further, as described in the aforementioned Non Patent Literatures 1 to 4, manganese dioxide and activated charcoal have a property of adsorbing SOx and NOx. Consequently, in a case where these ozone purifying bodies have adsorbed SOx or NOx contained in atmospheric air, purification sites thereof are clogged in the same manner as for the above described snow-melting agents and the like. Thus, in the case of carrying an ozone purifying body on a vehicle component, how to deal with a deterioration in the function thereof is a problem.

The present invention has been conceived in view of the above described problem, and an object of the present invention is to provide an atmosphere-cleaning device for vehicles that is capable of restoring an ozone purification function of an ozone purifying body that is carried by a vehicle component.

Solution to Problem

To achieve the above described object, a first invention is an atmosphere-cleaning device for vehicles, including:
a vehicle component that is arranged at a location at which a flow path of atmospheric air is formed while a vehicle is travelling;
an ozone purifying body that is carried by the vehicle component and that has an ozone purification function;
remover injection means capable of injecting onto the ozone purifying body a remover for removing a deterioration-causing substance that causes a deterioration in an ozone purification function; and injection amount setting means for setting an injection amount of the remover from the remover injection means using at least one of a rate of decline in an ozone purification rate based on an ozone purification rate in an initial state of the ozone purifying body, an atmospheric air velocity with respect to atmospheric air passing through the ozone purifying body, and a bed temperature of the ozone purifying body.

A second invention is in accordance with the first invention, further including:
bed temperature acquisition means for acquiring the bed temperature,
wherein the injection amount setting means sets so that, the higher the bed temperature that is acquired is, the greater the injection amount becomes.

A third invention is in accordance with the first or second invention, further including:
atmospheric air velocity acquisition means for acquiring the atmospheric air velocity,
wherein the injection amount setting means sets so that, the higher the atmospheric air velocity that is acquired is, the greater the injection amount becomes.

A fourth invention is in accordance with any one of the first to third inventions, further including:
rate of decline acquisition means for acquiring the rate of decline,
wherein the injection amount setting means sets so that, the larger the rate of decline that is acquired is, the greater the injection amount becomes.

A fifth invention is in accordance with any one of the first to fourth inventions, wherein:
the remover is a liquid;
the atmosphere-cleaning device for vehicles further including divided injection control means for controlling the remover injection means so as to divide an operation to inject the remover from the remover injection means into a main injection, and a pre-injection in which the remover is injected at a lower injection pressure than in the main injection.

A sixth invention is in accordance with the fifth invention, further including:
rate of decline acquisition means for acquiring the rate of decline,
wherein the divided injection control means includes injection condition setting means for, in a case where the rate of decline that is acquired is within a set range, increasing an injection proportion of the remover at a pre-injection time and also setting an interval period between the pre-injection and the main injection to a long period in accordance with the rate of decline, and in a case where the rate of decline that is acquired is lower than the set range, keeping the injection proportion constant, and setting the interval period to a long period in accordance with the rate of decline.

A seventh invention is in accordance with the first invention, further including:
stop condition determination means for determining whether or not a predetermined stop condition relating to the vehicle is established;
vehicle travelled distance acquisition means for acquiring a travelled distance of the vehicle from a previous time the predetermined stop condition is established until a current time the predetermined stop condition is established; and
stop-time injection amount setting means for, in a case where it is determined that the predetermined stop condition is established, prohibiting injection amount setting by the injection amount setting means, and setting an injection amount of the remover from the remover injection means using the travelled distance of the vehicle that is acquired.

An eighth invention is in accordance with the seventh invention, wherein:
the stop-time injection amount setting means sets so that, the longer the travelled distance of the vehicle that is acquired is, the greater the injection amount becomes.

A ninth invention is in accordance with the seventh or eighth invention, wherein:
the remover is a liquid;
the atmosphere-cleaning device for vehicles further including:
a fan that is capable of sending atmospheric air that is present at a rear of the vehicle component to a front of the vehicle component; and
fan control means for, in a case where it is determined that the predetermined stop condition is established, controlling the fan in advance of control of the remover injection means.

A tenth invention is in accordance with any one of the first to ninth inventions, wherein:
the remover injection means is an injector having a plurality of injection holes, and the plurality of injection holes are respectively arranged facing a plurality of regions that are previously set as regions in which a passing atmospheric air amount is large of a surface of the vehicle component.

An eleventh invention is in accordance with the tenth invention, wherein:
the injector includes:
a plate that has a single injection hole and that is disposed so as to cover the plurality of injection holes, and
plate rotation means for rotating the plate so that one injection hole among the plurality of injection holes, and the single injection hole communicate per injection.

A twelfth invention is in accordance with any one of the first to ninth inventions, wherein:
the remover injection means is a plurality of injectors, and injection holes of the plurality of injectors are respectively arranged facing a plurality of regions that are previously set as regions in which a passing atmospheric air amount is large of a surface of the vehicle component.

A thirteenth invention is in accordance with any one of the first, second or fourth to ninth inventions, wherein:
the vehicle component is a casing that is provided in a vehicle width direction, and
the remover injection means comprises piping that is extended in the vehicle width direction at an upper portion of the casing and is configured to be capable of injecting the remover along a surface of the casing from the upper portion to a lower portion of the casing.

A fourteenth invention is in accordance with the thirteenth invention, further including:
atmospheric air velocity acquisition means for acquiring the atmospheric air velocity,
wherein the injection amount setting means sets so that, the higher the atmospheric air velocity that is acquired is, the less an injection amount of the remover from the piping becomes.

A fifteenth invention is in accordance with any one of the first to fourteenth inventions, wherein:
the vehicle component is a radiator or an intercooler.

A sixteenth invention is in accordance with any one of the first to fifteenth inventions, wherein:
the ozone purifying body includes a porous material.

A seventeenth invention is in accordance with any one of the first to sixteenth inventions, wherein:
the remover is antifreeze or water.

Advantageous Effects of Invention

According to the first invention, since a remover for removing deterioration-causing substances that cause a deterioration in an ozone purification function can be injected onto the aforementioned ozone purifying body from the aforementioned remover injection means, the function of the ozone purifying body that is carried by the aforementioned vehicle component can be restored. Further, since an injection amount of the remover from the remover injection means can be set using at least one of a rate of decline in an ozone purification rate based on an ozone purification rate in an initial state of the ozone purifying body, a velocity of atmospheric air that passes through the ozone purifying body, and a bed temperature of the ozone purifying body, the aforementioned functional restoration can be effectively promoted.

A deterioration in the function of the ozone purifying body arises as a result of the aforementioned deterioration-causing substances adhering to and accumulating on the ozone purifying body. However, it is not the case that the deterioration-causing substances constantly adhere to and accumulate on the ozone purifying body, and some deterioration-causing substances detach therefrom after adhering. However, moisture is present in atmospheric air and on road surfaces, and the aforementioned deterioration-causing substances adhere to the ozone purifying body together with such moisture. There is a tendency for moisture to easily evaporate when the velocity of atmospheric air passing through the ozone purifying body is high, or when the bed temperature of the ozone purifying body is high. As it becomes easier for adhered moisture to evaporate, it also becomes easier for the deterioration-causing substances to accumulate on the ozone purifying body. In this regard, according to the second invention, the aforementioned injection amount can be set to a progressively larger amount as the bed temperature increases. Further, according to the third invention, the injection amount can be set to a progressively larger amount as the velocity of the atmospheric air increases. Therefore, according to these inventions, since the injection amount can be set to a larger amount in a situation in which the deterioration-causing substances are liable to accumulate, the aforementioned functional restoration can be effectively promoted.

The rate of decline in the ozone purification rate based on the ozone purification rate in the initial state of the ozone purifying body increases as the amount of the deterioration-causing substances that accumulate on the ozone purifying body increases. In this regard, according to the fourth invention, the injection amount can be set to a progressively larger amount as the rate of decline increases. Accordingly, even in a case where a large amount of the deterioration-causing substances accumulate on the ozone purifying body, the deterioration-causing substances can be detached and removed by means of a large amount of remover.

In a case where a liquid remover is used, the fluidity of the aforementioned deterioration-causing substances is increased by the liquid remover and the deterioration-causing substances are washed off. In this regard, according to the fifth invention, since pre-injection can be performed using an injection pressure that is lower than for a main injection, the affinity between the deterioration-causing substances and the liquid remover can be raised and the fluidity of the deterioration-causing substances can be restored. Further, since the main injection can be performed after the pre-injection, the deterioration-causing substances whose fluidity was restored can be efficiently washed away. Accordingly, the function of the ozone purifying body can be efficiently restored.

As described above, the aforementioned rate of decline increases as the amount of the deterioration-causing substances that accumulate on the ozone purifying body increases. In this regard, according to the sixth invention, in a case where the rate of decline is within the aforementioned set range, an injection proportion of the liquid remover at a time of pre-injection is increased and an interval period between the pre-injection and the main injection is set to a longer period, and hence the fluidity of the deterioration-causing substances can be gently restored. Further, since the aforementioned injection proportion is kept constant in a case where the rate of decline is lower than the set range, it is possible to secure a cleaning effect by the main injection and also gentle restoration of the fluidity by the setting of the aforementioned interval period in a compatible manner.

According to the seventh invention, if it is determined that a predetermined stop condition relating to the vehicle is established, since the aforementioned remover injection means can be controlled and the remover can be injected onto the ozone purifying body, the function of the ozone purifying body can be restored even while the vehicle is stopped. Further, since injection amount setting by the aforementioned injection amount setting means is prohibited and an injection amount of the remover from the remover injection means is set using the aforementioned travelled distance of the vehicle that is acquired, the above described functional restoration can be effectively promoted while the vehicle is stopped.

There is a tendency for the amount of deterioration-causing substances that accumulate on the ozone purifying body to increase as the travelled distance of the vehicle becomes longer. In this regard, according to the eighth invention, the injection amount can be set to a progressively larger amount as the travelled distance of the vehicle increases. Accordingly, the functional restoration of the ozone purifying body can be effectively promoted while the vehicle is stopped.

According to the ninth invention, the aforementioned fan can be controlled in advance of control of the remover injection means. Since the fan can send atmospheric air from the rear of the vehicle component to the front thereof, some of the deterioration-causing substances that adhere or the like to the ozone purifying body can be blown off and removed prior to injecting the liquid remover. Accordingly, the function of the ozone purifying body can be restored more efficiently.

The larger that the amount of passing atmospheric air is, the greater the amount of the deterioration-causing substances that accumulate on the ozone purifying body will be. In this regard, according to the tenth to twelfth inventions, remover can be injected at a plurality of regions that are previously set as regions in which a passing atmospheric air amount is large of the surface of the vehicle component. Accordingly, the remover can be selectively injected onto regions in which the accumulated amount of the deterioration-causing substances is large, and the function of the ozone purifying body can be effectively restored.

According to the thirteenth invention, since remover can be injected along the surface of a casing as the aforementioned vehicle component from piping as the aforementioned remover injection means, the deterioration-causing substances that have accumulated on the ozone purifying body can be washed off in the downward direction and removed. However, because the casing is provided in the vehicle width direction, when the vehicle is travelling at a high speed the injected remover flows to the rear of the casing together with the atmospheric air. In this regard, according to the fourteenth invention, since the injection amount can be set to a progressively smaller amount as the atmospheric air velocity increases, the deterioration-causing substances can be reliably removed while travelling at a low speed, and injection of the remover can be avoided while the vehicle is travelling at a high speed, which is a time when the removal effect is low.

According to the fifteenth invention, in a case where the ozone purifying body is carried by a radiator or an intercooler, the ozone purification function thereof can be favorably restored. Further, according to the sixteenth invention, the function of an ozone purifying body including a porous material can be favorably restored. Furthermore, according to the seventeenth invention, the deterioration-causing substances can be favorably washed off and removed using antifreeze or water.

DESCRIPTION OF EMBODIMENTS

Embodiment 1

[Configuration of Atmosphere-Cleaning Device for Vehicles]

Figure 1:
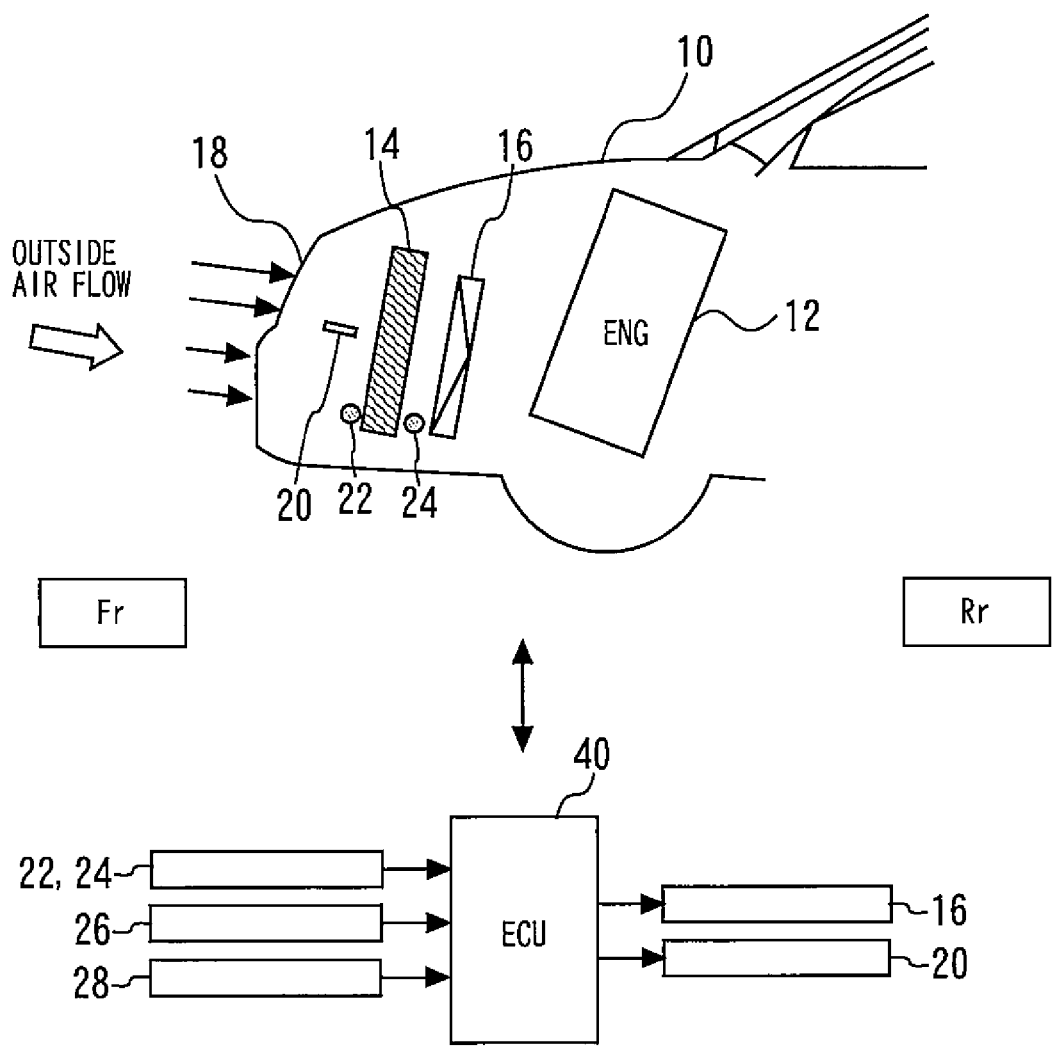
FIG. 1 is a view that illustrates a configuration of a vehicle in which an atmosphere-cleaning device according to an embodiment of the present invention is mounted.

First, Embodiment 1 of the present invention will be described while referring to FIG. 1 to FIG. 13. FIG. 1 is a view that illustrates the configuration of a vehicle in which an atmosphere-cleaning device according to the present embodiment is mounted. A vehicle 10 shown in FIG. 1 includes an internal combustion engine 12 as a power apparatus. HC and NOx are contained in exhaust gas that is discharged from the internal combustion engine 12. Ozone is generated by a photochemical reaction in which HC or NOx acts as a reactant. Consequently, the impact the vehicle 10 has on the environment can be reduced by mounting an atmosphere-cleaning device in the vehicle 10 and purifying ozone contained in atmospheric air entering the vehicle 10 while the vehicle 10 is travelling.

In the vehicle 10, a radiator 14 that cools cooling water that circulates in the internal combustion engine 12 is arranged in front of the internal combustion engine 12. An ozone purifying body having a function for purifying ozone is carried on a core portion of the radiator 14. A porous material such as activated charcoal or zeolite is used as the ozone purifying body. However, as well as the porous material, a metal oxide such as manganese dioxide may also be used, or a single metal such as manganese, iron, cobalt, nickel, copper, ruthenium, rhodium, palladium, silver, platinum or gold, or a metallic complex or organometallic complex that includes one of these single metals as a core metal may also be used.

Figure 2:
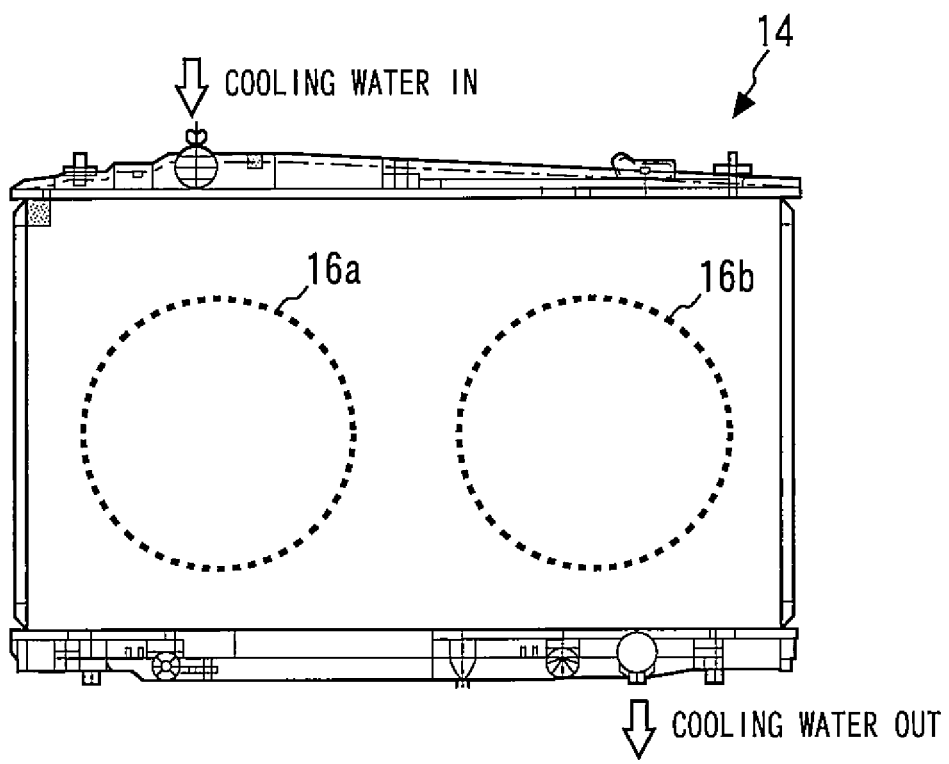
FIG. 2 is a front view of a radiator 14 shown in FIG. 1.

Two radiator fans 16a and 16b are installed at the rear of the radiator 14. The radiator fans 16a and 16b are mounted for the purpose of improving the cooling efficiency of cooling water flowing in the radiator 14. FIG. 2 is a front view of the radiator 14 shown in FIG. 1. As shown by dashed lines in FIG. 2, the radiator fans 16a and 16b are disposed in parallel at the rear of the radiator 14. The radiator fans 16a and 16b are configured to be capable of rotating in a forward direction and a reverse direction. When the radiator fans 16a and 16b are rotated in the forward direction, air at the front of the radiator 14 is drawn to the internal combustion engine 12 side. When the radiator fans 16a and 16b are rotated in the reverse direction, air that is present between the radiator fans 16a and 16b and the internal combustion engine 12 is blown out to the radiator 14 side.

Figure 3:
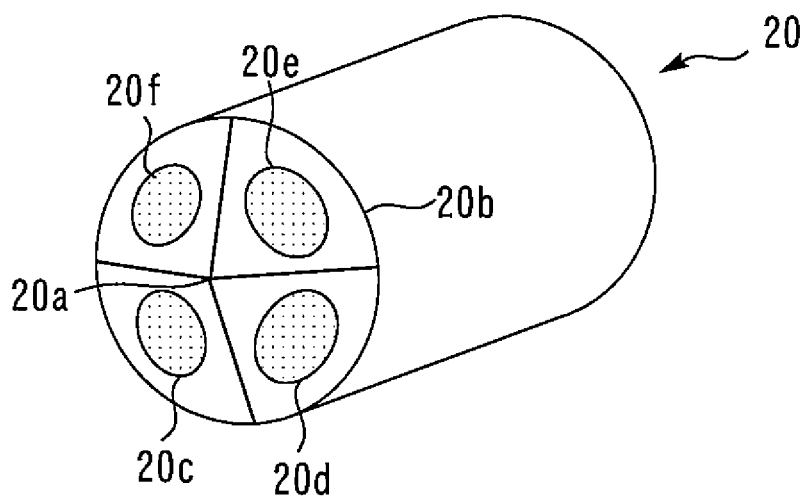
FIG. 3 is a schematic diagram of an injector 20 shown in FIG. 1.

Returning to FIG. 1, a radiator grille 18 is provided at a front portion of the vehicle 10. The radiator grille 18 includes a grille opening portion (not illustrated) for introducing outside air to the internal combustion engine 12 side. Further, an injector 20 is provided between the radiator 14 and the radiator grille 18. The injector 20 is connected to a cleaning liquid tank (not illustrated) such as a washer tank, and is configured to be capable of injecting a cleaning liquid (for example, antifreeze having ethylene glycol as a main component, or water which may include a weak acid component) from an injection hole thereof onto the surface of the radiator 14. FIG. 3 is a schematic diagram of the injector 20 shown in FIG. 1. As shown in FIG. 3, the injector 20 includes an injection face 20b that is constituted by four faces formed with a predetermined angle of inclination from a center 20a towards the outer circumference of the face. Four injection holes 20c to 20f are formed in the injection face 20b. The injection holes 20c to 20f are connected to the aforementioned cleaning liquid tank through a common internal flow path (not illustrated).

Returning again to FIG. 1, ozone sensors 22 and 24 that are capable of detecting an ozone concentration are provided at the front and rear of the radiator 14, respectively. Preferably, the ozone sensor 22 has a waterproof construction such that the cleaning liquid from the injector 20 does not adhere thereto.

An ECU (electronic control unit) 40 is mounted as a control apparatus in the vehicle 10. As shown in FIG. 1, the above described ozone sensors 22 and 24, a water temperature sensor 26 that detects a cooling water temperature of the internal combustion engine 12, and a wind velocity meter 28 that detects the velocity of atmospheric air that passes through the radiator 14 from the front of the radiator 14 towards the rear thereof (hereunder, referred to as "radiator-passing wind velocity") are connected to an input side of the ECU 40. In addition to the aforementioned sensors and the like, various sensors that detect operating information of the internal combustion engine 12 are connected to the input side of the ECU 40, such as a crank angle sensor that detects the engine speed and a speed sensor that detects the vehicle speed. The above described radiator fans 16a and 16b and the injector 20 and the like are connected to the output side of the ECU 40.

[Regarding Deterioration of Ozone Purification Function]

Mud, dust, snow-melting agents as well as SOx and NOx are scattered into the atmosphere as the result of being swirled up (splashed up) by a preceding vehicle or due to weather and climate conditions. When the vehicle 10 travels under such an environment, these extraneous substances flow in from the grille opening portion of the radiator grille 18 together with moisture contained in the atmospheric air, and contact with and adhere to a lower region of the radiator 14. Further, if the radiator fans 16a and 16b are rotating in the forward direction, the extraneous substances and the moisture that flowed in from the grille opening portion also move and adhere to an upper region of the radiator 14. At such time, travelling wind comes in contact with the surface of the radiator 14, and high temperature cooling water is fed to the internal flow path thereof. Consequently, moisture adhering to the surface of the ozone purifying body evaporates, and only the extraneous substances remain and accumulate. As a result, purification sites of the ozone purifying body are physically clogged. As the accumulated amount of extraneous substances increases, the purifying function of the ozone purifying body decreases. Therefore, in the present embodiment, a configuration is adopted that executes control (extraneous substance removal control) that washes away extraneous substances that have accumulated on the ozone purifying body.

[Extraneous Substance Removal Control]

The term "extraneous substance removal control" refers to control that, in a case where a predetermined removal implementation condition is established, injects a cleaning liquid from the injector 20 to wash away extraneous substances that have accumulated on the ozone purifying body. Since the fluidity of the extraneous substances can be increased by the cleaning liquid when the cleaning liquid is injected from the injector 20, the extraneous substances clogging the purification sites of the ozone purifying body can be washed away to a lower region of the radiator 14. It is thereby possible to restore the function of the ozone purifying body.

Figure 4:
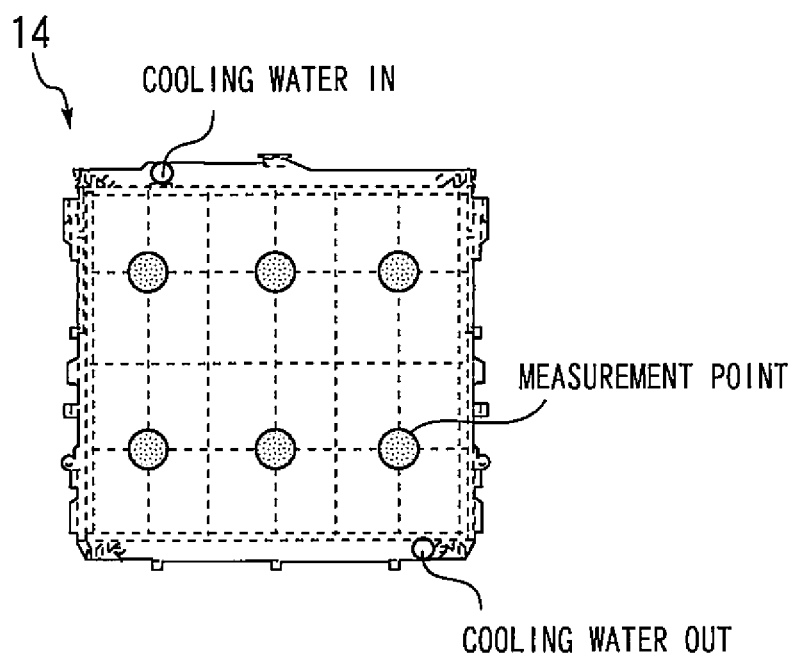
FIG. 4 is a view illustrating an example of dividing the surface of the radiator 14 into regions.

Note that, when injecting the cleaning liquid from the injector 20, preferably, by means of the arrangement of the injection holes 20c to 20f, a large amount of the injected cleaning liquid is caused to contact regions in which the amount of atmospheric air passing through the radiator 14 (passing atmospheric air amount) is large. The reason is that, in general, the larger that a passing atmospheric air amount is at a particular location, the higher that the frequency with which extraneous substances contact the relevant location will be (the contact frequency increases), and therefore it can be predicted that the accumulation amount of extraneous substances at the relevant location will be large. Hence, if injection can be performed in the above described manner, the accumulated extraneous substances can be efficiently washed away. Note that, the passing atmospheric air amount is calculated by dividing the surface of the radiator 14 into a plurality of regions, and by measuring the velocity of atmospheric air passing through the respective regions while the vehicle is travelling. FIG. 4 is a view that illustrates an example of dividing the surface region of the radiator 14. As shown in FIG. 4, a region in which a passing atmospheric air amount is large can be identified by acquiring the atmospheric air velocity at six measurement points.

To further enhance the fluidity of the extraneous substances, preferably the cleaning liquid is injected after being heated by an existing apparatus (not illustrated) of the vehicle. In addition, to ensure that the injected cleaning liquid comes in contact with the ozone purifying body, preferably the rotation speed of the radiator fans 16a and 16b is increased when injecting the cleaning liquid.

Figure 5:
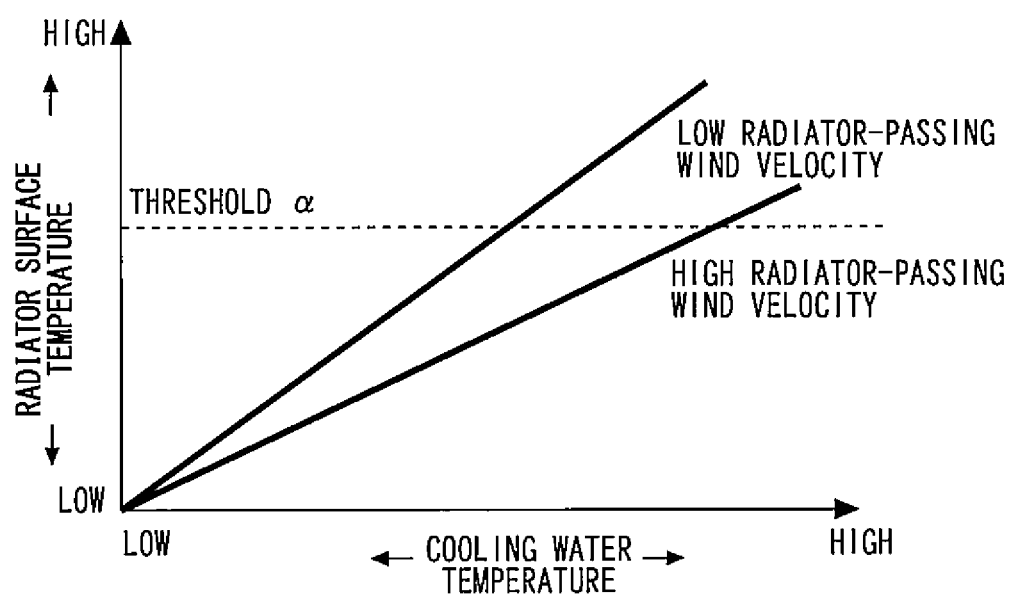
FIG. 5 is a view illustrating a relation between a cooling water temperature and a radiator-passing wind velocity, and a radiator surface temperature.

The aforementioned predetermined removal implementation condition is established in a case where the vehicle is in an environment in which moisture contained in extraneous substances adhered to the surface of the ozone purifying body is liable to evaporate (hereunder, referred to as "condition (i)"), or in a case where an ozone purification rate is lower than a set value $\beta$ (hereunder, referred to as "condition (ii)"). In the present embodiment, condition (i) is established in a case where the radiator surface temperature (that is, the bed temperature of the ozone purifying body) is higher than a set temperature a (for example, 80° C.). Note that the radiator surface temperature is estimated based on the radiator-passing wind velocity and the cooling water temperature. FIG. 5 is a view that illustrates the relation between the cooling water temperature and radiator-passing wind velocity and the radiator surface temperature. In the present embodiment, data in which the relationship illustrated in FIG. 5 is defined as a map is previously stored in the ECU 40.

Figure 6:
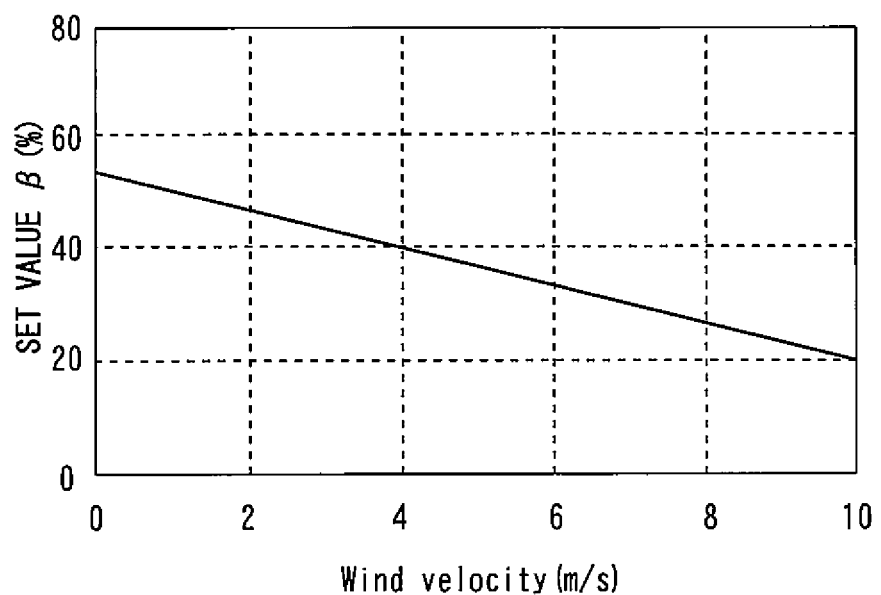
FIG. 6 is a view illustrating a relation between the radiator-passing wind velocity and a set value β.

Further, the set value $\beta$ of condition (ii) is set in accordance with the radiator-passing wind velocity, as a minimum value of an ozone purification rate for the DOR system to be established. FIG. 6 is a view illustrating the relation between the radiator-passing wind velocity (wind velocity) and the set value $\beta$. As shown in FIG. 6, the set value $\beta$ is set to 50% in a case where the radiator-passing wind velocity is 1 m/s, and is set to 20% in a case where the radiator-passing wind velocity is 10 m/s. In the present embodiment, data in which the relationship illustrated in FIG. 6 is defined as a map is previously stored in the ECU 40. Note that, the ozone purification rate that is compared with the set value $\beta$ with respect to condition (ii) is a ratio of the concentrations of ozone before and after the radiator 14 (ozone purification rate=rear side ozone concentration/front side ozone concentration).

Figure 7:
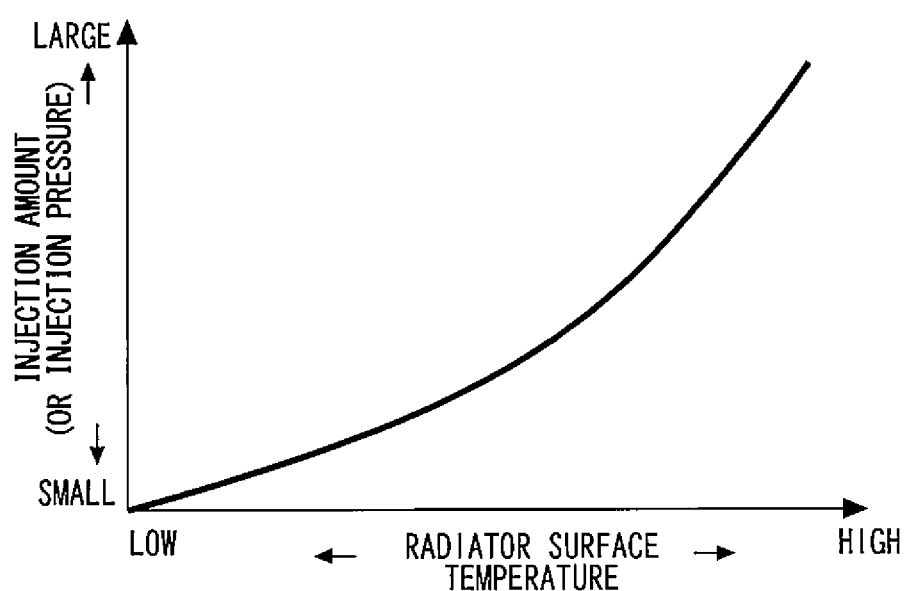
FIG. 7 is a view illustrating a relation between a cleaning liquid injection amount (cleaning liquid injection pressure) from the injector 20 and the radiator surface temperature.

In the present embodiment, the amount of cleaning liquid injected from the injector 20 is set in accordance with the radiator surface temperature. FIG. 7 is a view illustrating the relation between the cleaning liquid injection amount (cleaning liquid injection pressure) from the injector 20 and the radiator surface temperature. As shown in FIG. 7, the cleaning liquid injection amount (cleaning liquid injection pressure) from the injector 20 is set so that, the higher the radiator surface temperature becomes, the greater the cleaning liquid injection amount becomes (in the case of the cleaning liquid injection pressure, the higher the pressure becomes). The reason is that, the higher the radiator surface temperature becomes, the easier it becomes for moisture that adheres to the surface of the ozone purifying body to evaporate. In the present embodiment, data in which the relationship illustrated in FIG. 7 is defined as a map is previously stored in the ECU 40. Note that, as described previously with respect to FIG. 5, the radiator surface temperature is estimated based on the cooling water temperature and the radiator-passing wind velocity.

Figure 8:
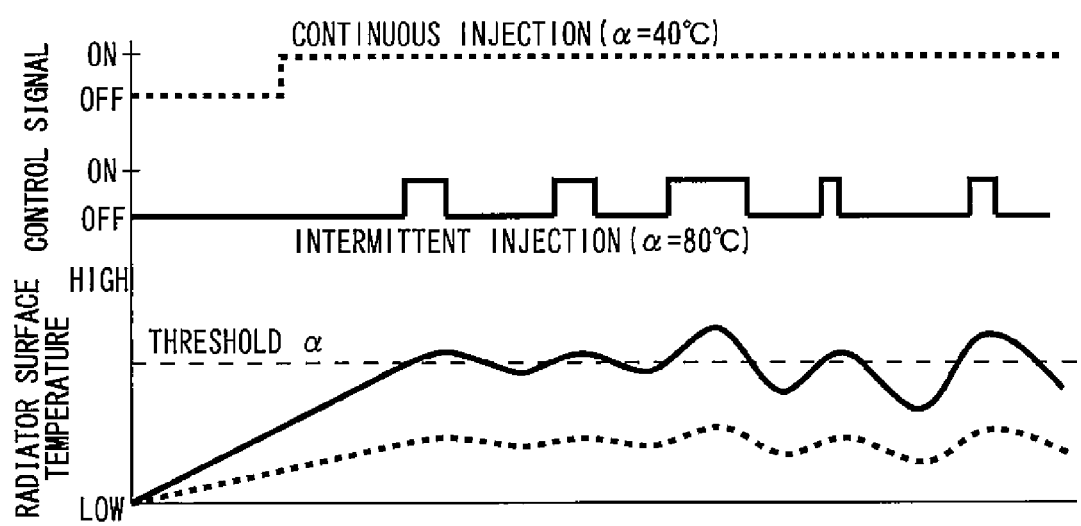
FIG. 8 is a timing chart for describing a feature of extraneous substance removal control according to Embodiment 1.

FIG. 8 is a timing chart for describing a feature of the extraneous substance removal control of the present embodiment. Note that, in FIG. 8, an injection signal from the ECU 40 is switched between "on" and "off" in accordance with whether or not the condition (i) is established. Generally, the cooling water temperature during engine operation is between 60° C. and 90° C. Consequently, for example, in a case where the set temperature a was set to 80° C., the injection signal is frequently switched between "on" and "off", and the cleaning liquid from the injector 20 is intermittently injected (see the solid line in FIG. 8). In the present embodiment, the set temperature a is set so that injection is performed intermittently, in a manner that takes into account the aforementioned cooling water temperature range. The reason is that if the set temperature a is set to a low temperature (for example 40° C.), the injection signal will be continuously "on", and there is a possibility that there will be a shortage of the cleaning liquid (see dashed line in FIG. 8) as a result of the injector 20 continuously injecting the cleaning liquid. In other words, by setting the set temperature a in the same manner as in the present embodiment, it is possible to promote restoration of the function of the ozone purifying body while preventing a shortage of the cleaning liquid.

[Specific Processing in Embodiment 1]

Figure 9:
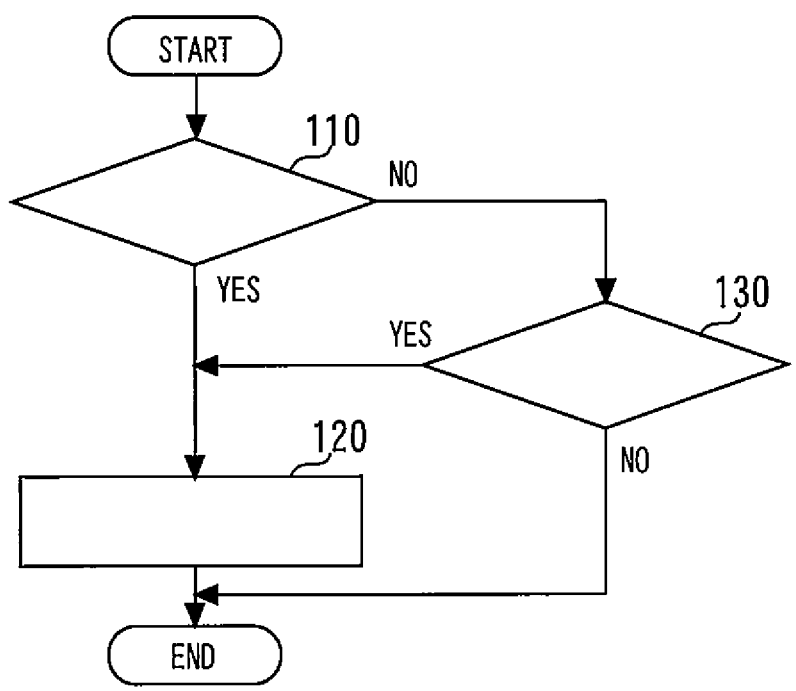
FIG. 9 is a flowchart illustrating a routine for extraneous substance removal control that is executed by an ECU 40 in Embodiment 1.

Next, specific processing for implementing the above described functions is described with reference to FIG. 9. FIG. 9 is a flowchart that illustrates a routine for extraneous substance removal control that is executed by the ECU 40 according to the present embodiment. The routine shown in FIG. 9 is repeatedly executed while the vehicle 10 is travelling.

According to the routine shown in FIG. 9, first the ECU 40 determines whether or not condition (i) is established (step 110). In the present step, the ECU 40 acquires each of the sensor outputs of the water temperature sensor 26 and the wind velocity meter 28. Next, the ECU 40 applies each of the acquired sensor outputs to the map described in FIG. 6 and determines the radiator surface temperature. Next, the ECU 40 compares the determined radiator surface temperature and the set temperature a that has been previously stored. If the ECU 40 determines that the radiator surface temperature is higher than the set temperature a, it can be determined that the vehicle 10 is travelling under an environment in which moisture on the surface of the ozone purifying body is liable to evaporate. Therefore, the ECU 40 proceeds to step 120 to inject cleaning liquid from the injector 20. Note that, at the time of injecting the cleaning liquid, the radiator surface temperature determined in step 110 is applied to the map described in FIG. 7 to determine the cleaning liquid injection amount. In contrast, if the ECU 40 determines that the radiator surface temperature is lower than the set temperature a, the ECU 40 proceeds to step 130.

In step 130, the ECU 40 determines whether or not the condition (ii) is established. Specifically, the ECU 40 acquires each of the sensor outputs of the ozone sensors 22 and 24, and determines the ozone purification rate. Further, the ECU 40 applies the sensor output of the wind velocity meter 28 to the map described in FIG. 6 and determines the set value β. Note that the value acquired in step 110 is used as the sensor output of the wind velocity meter 28. Next, the ECU 40 compares the determined ozone purification rate and the set value β. If the ozone purification rate is lower than the set value β, the ECU 40 proceeds to step 120 to inject cleaning liquid from the injector 20. In contrast, if the ozone purification rate is higher than the set value β, since it can be determined that it is not necessary to remove extraneous substances at the current time, the ECU 40 ends the present routine.

As described above, according to the routine illustrated in FIG. 9, cleaning liquid can be injected from the injector 20 in a case where the condition (i) or the condition (ii) is established. That is, in an environment in which a large amount of extraneous substances are liable to accumulate, or in a case where it is objectively determined that the function of the ozone purifying body is declining, the fluidity of the extraneous substances can be raised and the extraneous substances can be washed away. Accordingly, the function of the ozone purifying body can be restored.

In this connection, although in the above described Embodiment 1 the ozone purifying body is carried by the radiator 14, a configuration may also be adopted in which the ozone purifying body is carried by an intercooler. An intercooler is, for example, mounted in a turbo internal combustion engine, and similarly to the radiator 14, is disposed at a location at which a flow path of atmospheric air is formed while the vehicle 10 is travelling. Therefore, a similar effect as in the present embodiment can be obtained by installing the injector 20 in front of the intercooler and injecting the cleaning liquid. Note that the present modification example can be similarly applied with respect to the respective embodiments that are described later.

Figure 10:
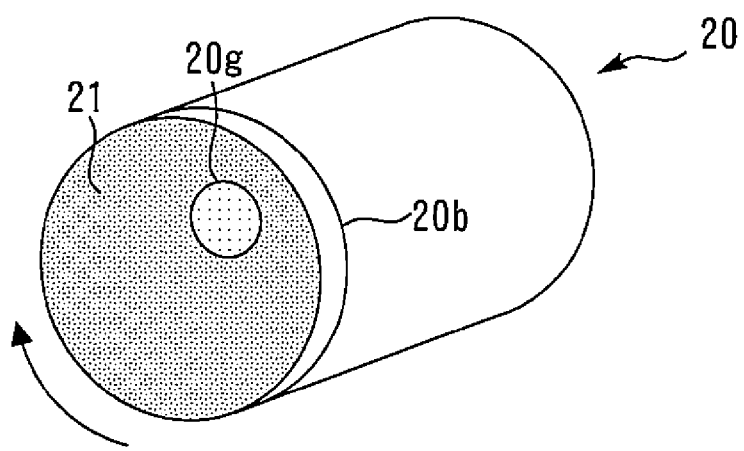
FIG. 10 is a schematic diagram of an injector according to a modification example of Embodiment 1.

Further, although the injector 20 is used in the above described Embodiment 1, the configuration, number and arrangement locations of the injector 20 is not limited to the example described in the present embodiment, and various modifications are possible. FIG. 10 is a schematic diagram illustrating an injector according to a modification example of the above described Embodiment 1. As shown in FIG. 10, an injector structure is adopted in which a plate 21 having an injection hole 20g is arranged on an injection face 20b, and the plate 21 can be rotated by unshown plate rotation means to cause a large amount of injected cleaning liquid to come in contact with regions in which a passing atmospheric air amount is large as described above referring to FIG. 4. Further, for example, a plurality of injectors having a single injection hole can also be arranged facing the aforementioned regions, respectively.

Although in the above described Embodiment 1 a cleaning liquid is injected, air may be injected instead of the cleaning liquid. If air injection is performed, extraneous substances clogging purification sites of the ozone purifying body can be removed by being blown away. Hence, similarly to the above described Embodiment 1, it is possible to restore the function of the ozone purifying body. Note that, the present modification example can be similarly applied with respect to Embodiments 3 and 4 that are described later.

Further, although in the above described Embodiment 1 the radiator-passing wind velocity is detected by the wind velocity meter 28, a configuration may also be adopted in which the radiator-passing wind velocity is estimated based on the vehicle speed that is detected by a speed sensor. Note that these modification examples can be similarly applied with respect to the respective embodiments that are described later.

Figure 11:
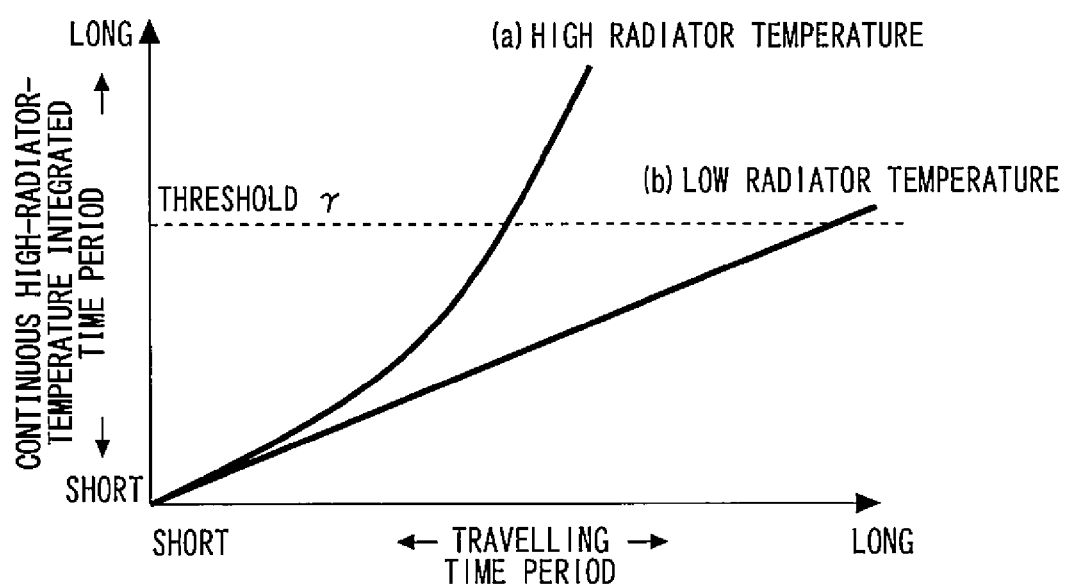
FIG. 11 is a view illustrating a relation between the radiator surface temperature and a travelling time period, and a continuous high-radiator-temperature integrated time period.

Furthermore, although the radiator surface temperature is used in condition (i) in the above described Embodiment 1, a continuous high-radiator-temperature integrated time period may be used instead of the radiator surface temperature. The term "continuous high-radiator-temperature integrated time period" refers to an integrated travelling time period in which the radiator surface temperature is in a predetermined high temperature state, and is set in accordance with the radiator surface temperature. FIG. 11 is a view illustrating the relation between the radiator surface temperature and travelling time period, and the continuous high-radiator-temperature integrated time period. As shown in FIG. 11, the continuous high-radiator-temperature integrated time period in a case where the radiator surface temperature is a low temperature (for example, less than 60° C.) is set so as to be in proportion to the travelling time period ((b) in FIG. 11). On the other hand, the continuous high-radiator-temperature integrated time period in a case where the radiator surface temperature is a high temperature (for example, 60° C. or more) is set so as to increase quadratic-functionally ((a) in FIG. 11). The reason is that moisture adhering to the radiator evaporates more easily when travel under a condition in which the radiator is at a high temperature continues for an extended time period. Note that in the case of using the continuous high-radiator-temperature integrated time period as a substitute for the radiator surface temperature, the condition (i) is assumed to be established in a case where, at the determination time, the continuous high-radiator-temperature integrated time period is longer than a set time period γ (for example, in a case where the temperature is 60° C. or more, the set time period γ=10 minutes). By previously storing data in which the relation illustrated in FIG. 11 is defined as a map in the ECU 40, whether or not the condition (i) is established can be determined based on the continuous high-radiator-temperature integrated time period. Note that the present modification example can be similarly applied with respect to the respective embodiments that are described later.

Although the condition (i) and the condition (ii) are used as the aforementioned predetermined removal implementation conditions in the above described Embodiment 1, the predetermined removal implementation conditions are not limited to these conditions. That is, any condition can be used as the predetermined removal implementation condition instead of the aforementioned conditions (i) and (ii) as long as the relevant condition is one with which it can be objectively determined that an accumulated amount of extraneous substances is increasing. For instance, the weather and climate in a region in which the vehicle is travelling may be mentioned as an example of such a condition. More specifically, it can be predicted that a scattered amount of extraneous substances will increase in the case of rainy weather or strong winds. Accordingly, if weather and climate information for a region in which the vehicle is travelling can be obtained, such information can be used as a substitute as the predetermined removal implementation condition. A following distance between the preceding vehicle and the own vehicle may also be mentioned as an example of such a condition. If the following distance can be obtained, it can be estimated whether or not the environment is one in which extraneous substances are liable to be swirled up by a preceding vehicle.

Figure 12:
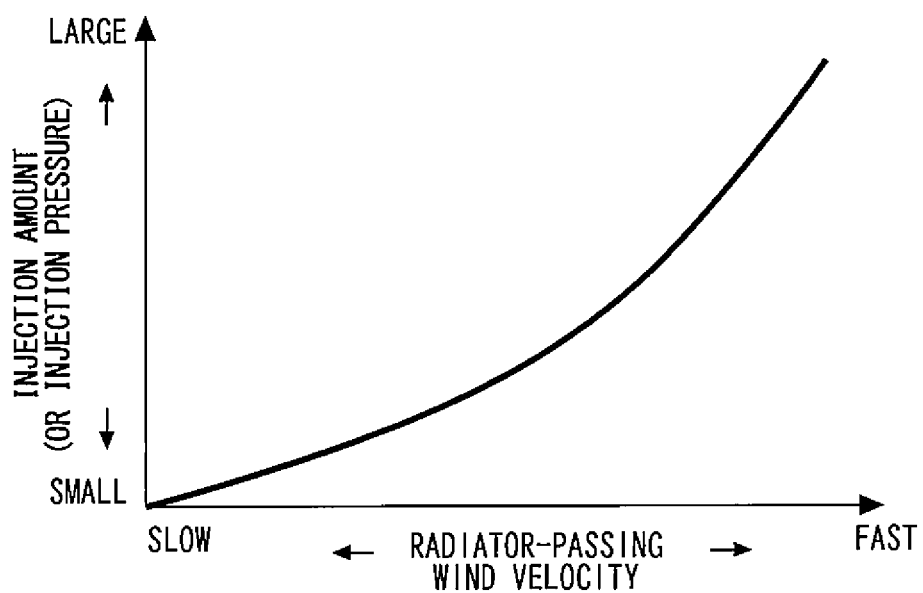
FIG. 12 is a view illustrating a relation between a cleaning liquid injection amount (cleaning liquid injection pressure) from the injector 20 and the radiator-passing wind velocity.

Further, although in the above described Embodiment 1 the cleaning liquid amount that is injected from the injector 20 is set according to the radiator surface temperature, the radiator-passing wind velocity may be used instead of the radiator surface temperature. The reason is that the radiator-passing wind velocity has a correlation with the radiator surface temperature and, furthermore, it becomes easier for the moisture adhered to the surface of the ozone purifying body to evaporate as the radiator-passing wind velocity increases. FIG. 12 is a view illustrating the relation between the cleaning liquid injection amount (cleaning liquid injection pressure) from the injector 20 and the radiator-passing wind velocity. By previously storing data in which the relation illustrated in FIG. 12 is defined as a map in the ECU 40, the cleaning liquid injection amount can be set in accordance with the radiator-passing wind velocity.

Figure 13:
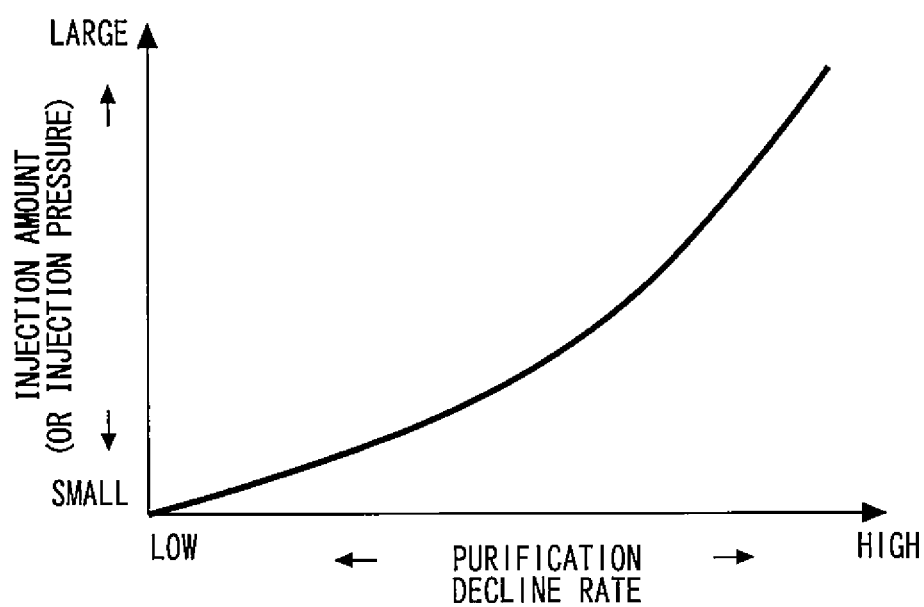
FIG. 13 is a view illustrating a relation between a cleaning liquid injection amount (cleaning liquid injection pressure) from the injector 20 and a purification decline rate.

The aforementioned cleaning liquid amount may also be set in accordance with a purification decline rate. In the present specification, the term "purification decline rate" refers to a rate of decline in the ozone purification rate based on the ozone purifying body in an initial state (purification decline rate=(ozone purification rate in initial state−ozone purification rate at time of setting the cleaning liquid injection amount)/ozone purification rate in initial state). Note that the ozone purification rate in the initial state is set in accordance with the radiator-passing wind velocity. FIG. 13 is a view illustrating the relation between the cleaning liquid injection amount (cleaning liquid injection pressure) from the injector 20 and the purification decline rate. By previously storing data in which the relation illustrated in FIG. 13 is defined as a map in the ECU 40, the cleaning liquid injection amount can be set in accordance with the purification decline rate.

In addition, it is also possible to set the cleaning liquid amount by appropriately combining the radiator surface temperature, the radiator-passing wind velocity and the purification decline rate.

Note that the respective modification example relating to setting of the cleaning liquid amount that are described above can be similarly applied with respect to Embodiments 2 and 4 that are described later.

Note that, in the foregoing Embodiment 1, the radiator 14 corresponds to "vehicle component" and the injector 20 corresponds to "remover injection means" in the above described first invention. In addition, in Embodiment 1, "injection amount setting means" in the first invention is realized by the ECU 40 determining the cleaning liquid injection amount based on the radiator surface temperature in step 110 in FIG. 9.

Further, in Embodiment 1, "bed temperature acquisition means" in the above described second invention is realized by the ECU 40 determining the radiator surface temperature in step 110 in FIG. 9.

In addition, in the above described modification example of Embodiment 1, "atmospheric air velocity acquisition means" in the above described third invention is realized by the ECU 40 determining the radiator-passing wind velocity instead of the radiator surface temperature.

Furthermore, in the above described modification example of Embodiment 1, "rate of decline acquisition means" in the above described fourth invention is realized by the ECU 40 determining the purification decline rate instead of the radiator surface temperature.

Embodiment 2

Next, Embodiment 2 of the present invention will be described while referring to FIG. 14 and FIG. 15. A feature of the present embodiment is that the atmosphere-cleaning device includes an injector that is connected to a low-pressure tank (hereunder referred to as "low-pressure injector") and an injector that is connected to a high-pressure tank (hereunder referred to as "high-pressure injector") instead of the injector 20 of the above described Embodiment 1, and executes an extraneous substance removal control routine illustrated in FIG. 15. Therefore, a detailed description of the configuration of the atmosphere-cleaning device and of the extraneous substance removal control will be omitted here.

[Extraneous Substance Removal Control in Embodiment 2]

As described in the foregoing Embodiment 1, the reason for injecting a cleaning liquid from the injector 20 is to raise the fluidity of extraneous substances that clog purification sites so that the extraneous substances are washed away. However, in a situation in which almost all of the adhered moisture has evaporated and residual extraneous substances are firmly stuck to the ozone purifying body, there is a possibility that the fluidity of the extraneous substances will not be restored even if the cleaning liquid is injected. Therefore, in the extraneous substance removal control of the present embodiment, divided injection of the cleaning liquid is performed using a low-pressure injector and a high-pressure injector.

In the present embodiment, the divided injection of the cleaning liquid is performed in the order of injection from the low-pressure injector (for example, injection at an injection pressure from 50 to 250 kPa; hereunder referred to as "pre-injection"), and injection from the high-pressure injector (for example, injection at an injection pressure from 300 to 500 kPa; hereunder referred to as "main injection"). As described above, the low-pressure injector is connected to a low-pressure tank, and the high-pressure injector is connected to a high-pressure tank. Consequently, by performing the divided injection in the order of pre-injection and main injection, it is possible to perform a powerful injection in the main injection after a gentle injection was performed in the pre-injection. Since it is possible to enhance the affinity between the extraneous substances and the cleaning liquid by performing a gentle injection, the fluidity of the extraneous substances can be restored thereby. Further, by performing a powerful injection after the gentle injection, the extraneous substances whose fluidity was restored can be efficiently washed away. Hence, the function of the ozone purifying body can be efficiently restored. Note that, in order to further improve the restoration of fluidity, preferably the cleaning liquid that is injected from the low-pressure injector is injected after being heated by an existing apparatus (not illustrated) of the vehicle.

Figure 14:
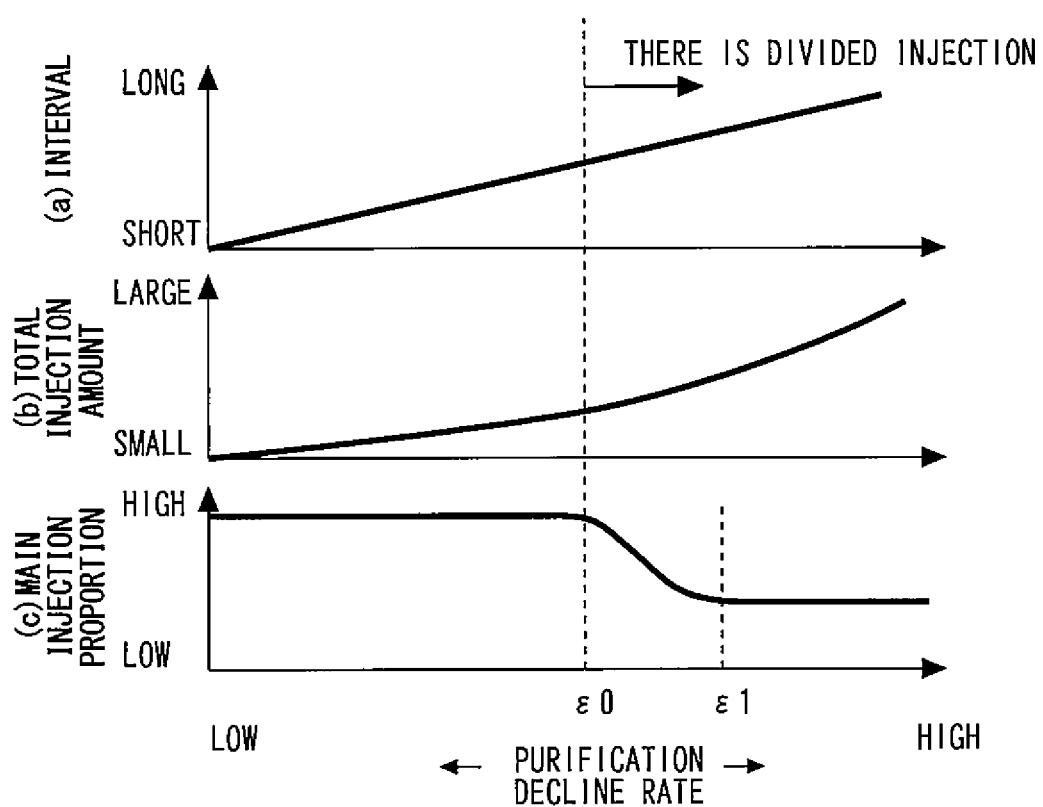
FIG. 14 is a view illustrating a relation between a purification decline rate and an interval period, a cleaning liquid injection amount, and a main injection proportion.

The divided injection of the cleaning liquid that is implemented by the extraneous substance removal control of the present embodiment will now be specifically described referring to FIG. 14. FIG. 14 is a view that illustrates a relation between a purification decline rate and (a) an interval period, (b) a cleaning liquid injection amount, and (c) a main injection proportion. As shown in FIG. 14, the divided injection is performed in a case where the purification decline rate is higher than a set value $\epsilon_0$. Further, as shown in (a) in FIG. 14, when performing the divided injection, an interval period is set between the main injection and the pre-injection. The interval period is set to a progressively longer period as the purification decline rate increases. The reason is that the higher that the purification decline rate is, the higher the possibility that extraneous substances are firmly stuck to the ozone purifying body, and therefore time is required to restore the fluidity. Further, as shown in (b) in FIG. 14, the cleaning liquid injection amount (total injection amount) is set to a progressively larger amount as the purification decline rate increases. The reason is the same as the above described reason for setting the interval period to a progressively longer period. In addition, as shown in (c) in FIG. 14, the main injection proportion is set to become progressively lower as the purification decline rate increases. However, since a cleaning effect is secured to a certain extent by the main injection, in a region in which the purification decline rate is higher than the set value CI, the main injection proportion is set to a fixed value. That is, in a region in which the purification decline rate is between the set value $\epsilon_0$ and the set value $\epsilon_1$, the pre-injection proportion is progressively increased as the purification decline rate increases.

As shown in FIG. 14, a fluidity restoration effect by the pre-injection can be enhanced by setting the interval period to a progressively longer period as the purification decline rate increases ((a) in FIG. 14), setting the cleaning liquid injection amount to a progressively larger amount as the purification decline rate increases ((b) in FIG. 14), and setting the pre-injection proportion to a progressively larger proportion as the purification decline rate increases in a region in which the purification decline rate is between the set value Co and the set value $\epsilon_1$ ((c) in FIG. 14). Accordingly, the extraneous substances can be efficiently washed away by the main injection after the interval period lapses. Note that, in the present embodiment, data in which the relationship illustrated in FIG. 14 is defined as a map is previously stored in the ECU 40.

[Specific Processing in Embodiment 2]

Next, specific processing for implementing the above described functions is described with reference to FIG. 15. FIG. 15 is a flowchart that illustrates a routine for extraneous substance removal control that is executed by the ECU 40 according to the present embodiment. The routine shown in FIG. 15 is repeatedly executed while the vehicle 10 is travelling.

Figure 15:
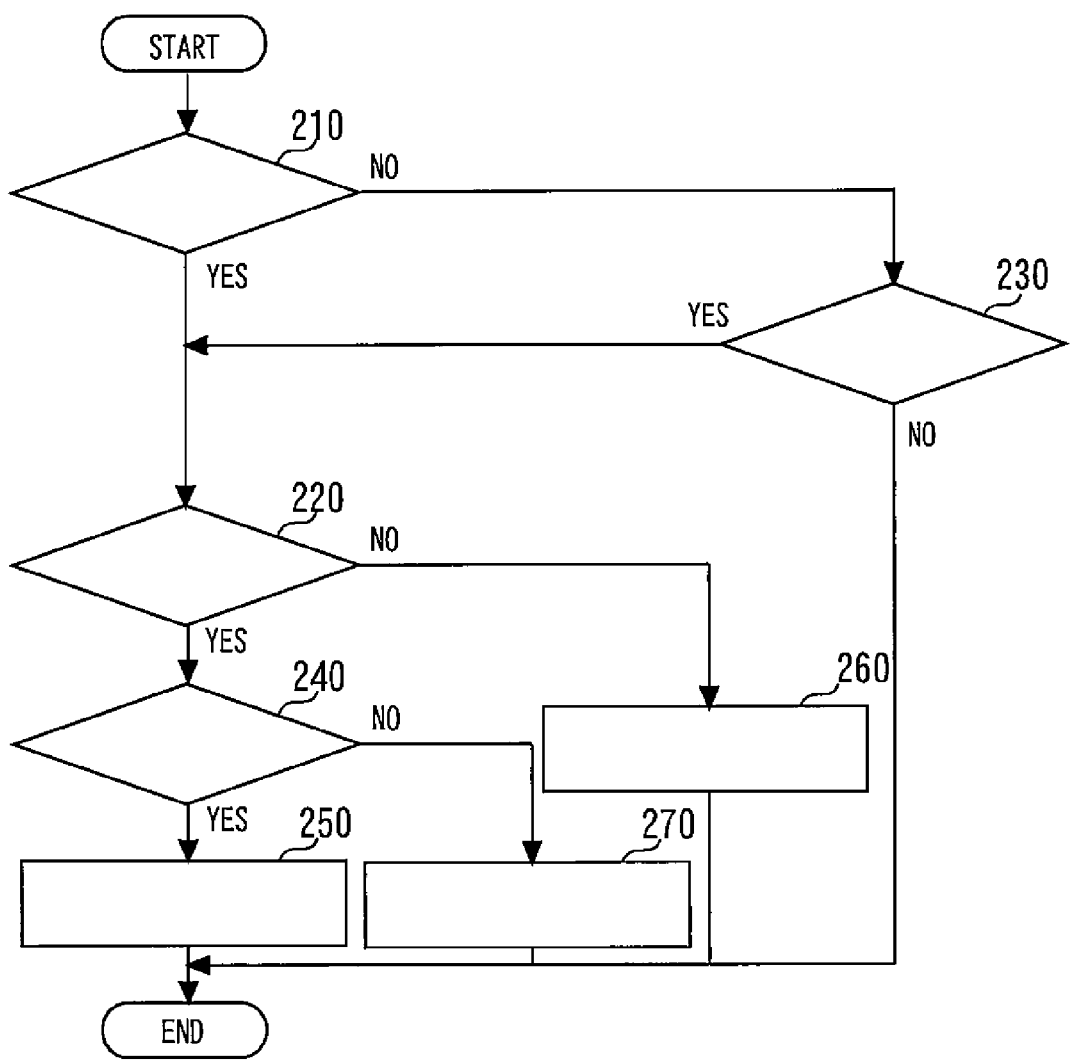
FIG. 15 is a flowchart illustrating a routine for extraneous substance removal control that is executed by the ECU 40 in Embodiment 2.

According to the routine shown in FIG. 15, first, the ECU 40 executes the processing in step 210. Since the processing in step 210 is the same as the processing in step 110 in FIG. 9, a description thereof is omitted here. Further, since the processing in step 230 is the same as the processing in step 130 in FIG. 9, a description thereof is omitted here.

In step 220, the ECU 40 determines whether or not the purification decline rate is higher than the set value $\epsilon_0$. More specifically, the ECU 40 acquires the sensor output of each of the ozone sensors 22 and 24 and determines the ozone purification rate. The ECU 40 also acquires the sensor output of the wind velocity meter 28, and based on the acquired sensor output, reads in an ozone purification rate in an initial state that has been previously set. Next, the ECU 40 calculates the purification decline rate using the ozone purification rate in the initial state that was read in and the determined ozone purification rate. Next, the ECU 40 compares the calculated purification decline rate and the set value $\epsilon_0$. If the ECU 40 determines that the purification decline rate is higher than the set value $\epsilon_0$, the ECU 40 proceeds to step 240. In contrast, if the ECU 40 determines that the purification decline rate is lower than the set value so, the ECU 40 proceeds to step 260.

In step 240, the ECU 40 determines whether or not the purification decline rate is lower than the set value $\epsilon_1$. Specifically, the ECU 40 compares the purification decline rate that was calculated in step 220 and the set value $\epsilon_1$. If the ECU 40 determines that the purification decline rate is lower than the set value $\epsilon_1$, the ECU 40 proceeds to step 250. In contrast, if the ECU 40 determines that the purification decline rate is higher than the set value $\epsilon_1$, the ECU 40 proceeds to step 270.

In steps 250 and 270, the ECU 40 performs divided injection using the low-pressure injector and the high-pressure injector. Note that, when performing divided injection of the cleaning liquid, the purification decline rate calculated in step 220 is applied to the map that was described above using FIG. 14 to thereby determine the interval period, the cleaning liquid injection amount and the main injection proportion.

In contrast, in step 260, the ECU 40 performs normal injection from the high-pressure injector. The processing in the present step is the same as the processing in step 120 in FIG. 9.

As described above, according to the routine illustrated in FIG. 15, in a case where the purification decline rate is higher than the set value $\epsilon_0$, the cleaning liquid can be injected by performing divided injection operations using the low-pressure injector and the high-pressure injector. Thus, the extraneous substances can be efficiently washed away. Accordingly, the function of the ozone purifying body can be efficiently restored.

In this connection, in the above described Embodiment 2 the divided injection is performed using two injectors, namely the low-pressure injector and the high-pressure injector. However, divided injection may also be performed using a single injector. In this case, for example, it is sufficient to realize injection pressures that correspond to the pre-injection and the main injection by changing the rotational speed of an accumulator pump that feeds the cleaning liquid to the injector.

Note that, in the above described Embodiment 2, "divided injection control means" in the above described fifth invention is realized by the ECU 40 executing the processing in steps 220, 240, 250 and 270 in FIG. 15.

Further, in the above described Embodiment 2, "rate of decline acquisition means" in the above described sixth invention is realized by the ECU 40 determining the purification decline rate in step 220 in FIG. 15, and "injection condition setting means" in the sixth invention is realized by the ECU 40 determining the interval period and the main injection proportion in steps 250 and 270 in FIG. 15.

Embodiment 3

Figure 16:
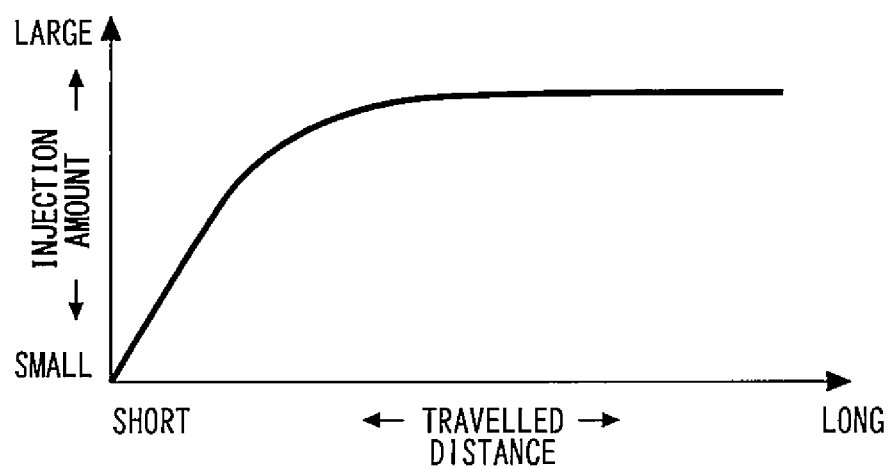
FIG. 16 is a view illustrating a relation between a cleaning liquid injection amount (cleaning liquid injection pressure) from the injector 20 and a travelled distance during a drive cycle.

Next, Embodiment 3 of the present invention will be described while referring to FIG. 16 and FIG. 17. A feature of the present embodiment is that the above described extraneous substance removal control is executed while the vehicle 10 is stopped. Therefore, a detailed description of the configuration of the atmosphere-cleaning device and of the extraneous substance removal control will be omitted here.

[Extraneous Substance Removal Control in Embodiment 3]

The extraneous substance removal control in the foregoing Embodiments 1 and 2 is executed while the vehicle 10 is travelling. However, in a case where operations in which the internal combustion engine 12 is stopped a short time after operation of the internal combustion engine 12 was started (so-called "short-trip driving") are repeated, there is a possibility that extraneous substances cannot be adequately removed during a drive cycle. Therefore, according to the present embodiment a configuration is adopted that executes extraneous substance removal control while the vehicle 10 is stopped.

In the present embodiment, the term "while the vehicle 10 is stopped" refers to a case where the vehicle 10 is under a predetermined stop condition, that is, a case where the vehicle speed and the engine speed are equal to or less than a set value, respectively. These set values are previously set so as to also include a time of deceleration of the vehicle 10, in addition to a time that the vehicle 10 is completely stopped and a time when the vehicle 10 is idling (also including a time during execution of so-called "start and stop control").

In the extraneous substance removal control of the present embodiment, the radiator fans 16a and 16b are rotated in reverse prior to injecting the cleaning liquid from the injector 20. As described above, when the radiator fans 16a and 16b are rotated in reverse, air that is present between the radiator fans 16a and 16b and the internal combustion engine 12 is sent to the radiator 14 side. That is, the air can be blown from the rear of the radiator 14 toward the front thereof by rotating the radiator fans 16a and 16b in reverse. By this means, some of the extraneous substances that are adhered and the like to the ozone purifying body can be blown off to the front of the radiator 14. That is, some of the extraneous substances that are adhered and the like to the ozone purifying body can be removed before injecting the cleaning liquid. Thus, according to the extraneous substance removal control of the present embodiment, it is possible to restore the function of the ozone purifying body more efficiently. Note that, a time period for which to rotate the radiator fans 16a and 16b in reverse is previously set, and stored in the ECU 40.

In the present embodiment, a cleaning liquid amount to be injected from the injector 20 is set in accordance with the travelled distance during a drive cycle. Here, the term "travelled distance during a drive cycle" refers to a distance travelled from the previous time that the aforementioned predetermined stop condition was established until the current time that the predetermined stop condition is established. FIG. 16 is a view illustrating the relation between the cleaning liquid injection amount (cleaning liquid injection pressure) from the injector 20 and the travelled distance during a drive cycle. As shown in FIG. 16, the cleaning liquid injection amount (cleaning liquid injection pressure) from the injector 20 is set so as to become larger (in the case of the cleaning liquid injection pressure, so as to become higher) in accordance with the travelled distance until the travelled distance reaches a predetermined distance. The reason is that the longer the travelled distance is, the easier it becomes for moisture adhering to the surface of the ozone purifying body to evaporate. However, when the travelled distance is longer than the predetermined distance, the cleaning liquid amount is set to a maximum injection amount (fixed value). In the present embodiment, data in which the relationship illustrated in FIG. 16 is defined as a map is previously stored in the ECU 40.

[Specific Processing in Embodiment 3]

Next, specific processing for implementing the above described functions is described with reference to FIG. 17. FIG. 17 is a flowchart that illustrates a routine for extraneous substance removal control that is executed by the ECU 40 according to the present embodiment. Note that, the routine shown in FIG. 17 is repeatedly executed at regular intervals.

Figure 17:
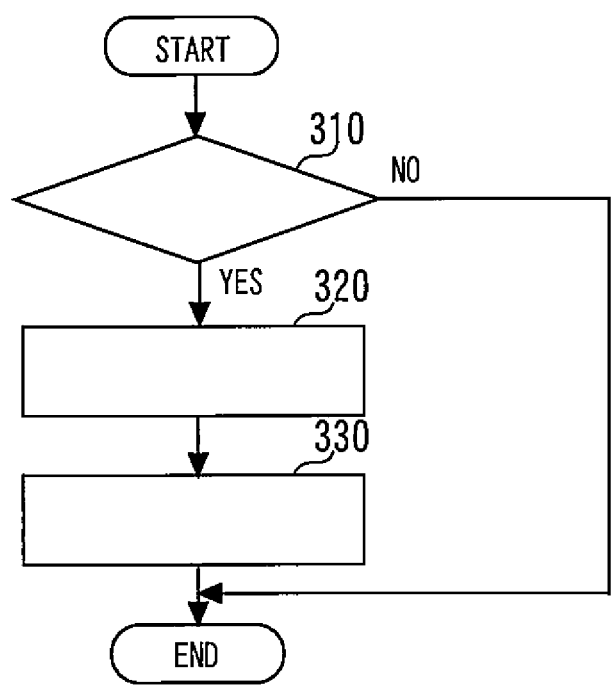
FIG. 17 is a flowchart illustrating a routine for extraneous substance removal control that is executed by the ECU 40 in Embodiment 3.

In the routine illustrated in FIG. 17, first the ECU 40 determines whether or not the vehicle 10 is under a predetermined stop condition (step 310). If it is determined that the vehicle 10 is under the predetermined stop condition, the ECU 40 executes the processing in step 320. In contrast, if it is determined in step 310 that the vehicle 10 is not under the predetermined stop condition, the ECU 40 ends the present routine.

In step 320 the ECU 40 causes the radiator fans 16a and 16b to rotate in reverse. Subsequently, after a set time period has passed, the ECU 40 proceeds to step 330. In step 330, the ECU 40 injects cleaning liquid from the injector 20. Note that, when injecting the cleaning liquid, the cleaning liquid injection amount is determined by applying the distance travelled during the drive cycle to the map described in FIG. 16.

Thus, according to the routine illustrated in FIG. 17, in a case where the vehicle 10 is under a predetermined stop condition, the cleaning liquid can be injected from the injector 20 after the radiator fans 16a and 16b have been caused to rotate in reverse. Some of the extraneous substances can be blown away by causing the radiator fans 16a and 16b to rotate in reverse. After the radiator fans 16a and 16b have been rotated in reverse, the extraneous substances can be efficiently washed away by injecting the cleaning liquid from the injector 20. Accordingly, the function of the ozone purifying body can be restored more efficiently.

Note that, in the above described Embodiment 3, "stop condition determination means" in the above described seventh invention is realized by the ECU 40 executing the processing in step 310 of FIG. 17, and "stop-time injection amount setting means" according to the seventh invention is realized by the ECU 40 executing the processing in step 330 of FIG. 17.

Further, in the above described Embodiment 3, the radiator fans 16a and 16b correspond to the "fan" in the above described ninth invention. Furthermore, "fan control means" in the ninth invention is realized by the ECU 40 executing the processing in step 320 of FIG. 17.

Embodiment 4

[Configuration of Atmosphere-Cleaning Device for Vehicles]

Figure 18:
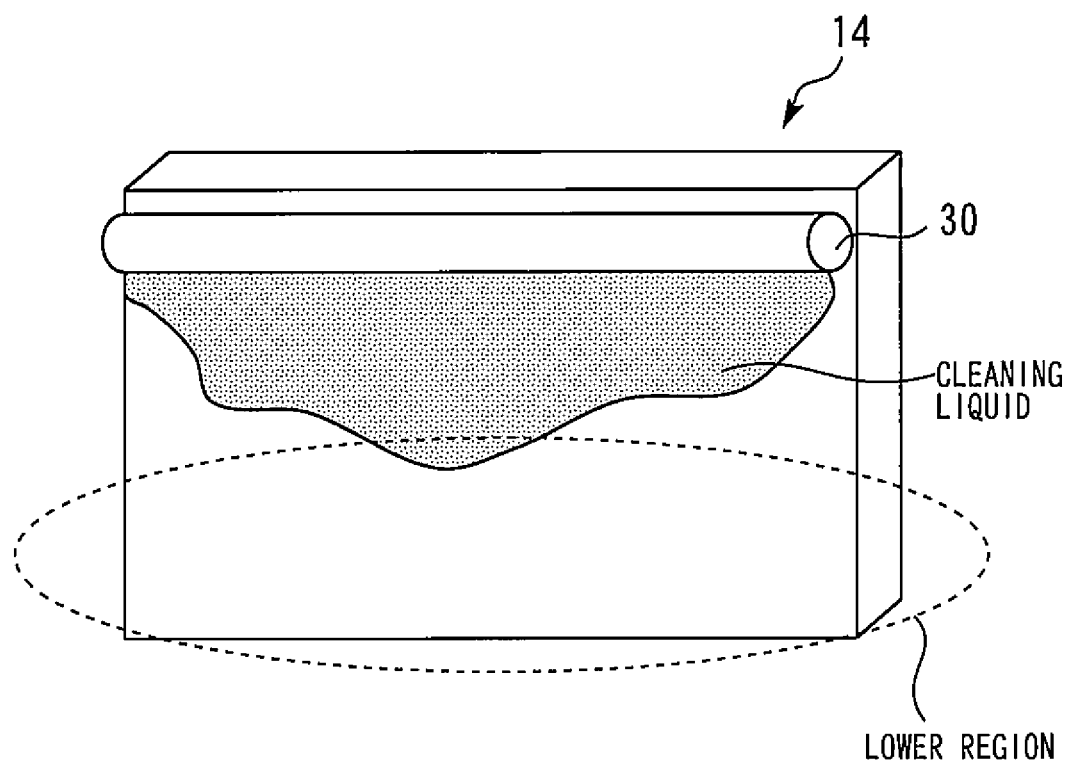
FIG. 18 is a front view of the radiator 14 according to Embodiment 4.
Figure 19:
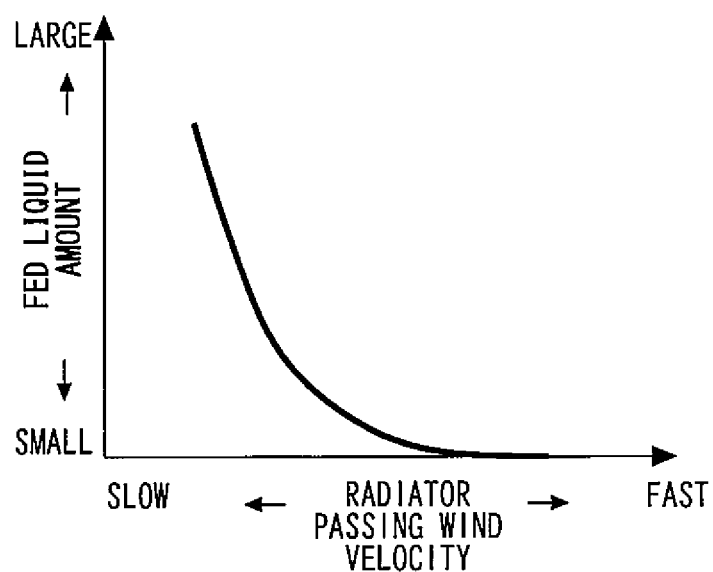
FIG. 19 is a view illustrating a relation between an amount of cleaning liquid that is fed to a pipe 30 and a radiator-passing wind velocity.

Next, Embodiment 4 of the present invention will be described referring to FIG. 18 and FIG. 19. FIG. 18 is a front view of the radiator 14 according to the present embodiment. As shown in FIG. 18, a pipe 30 through which cleaning liquid can be passed is provided at an upper part of the radiator 14. A plurality of injection holes (not illustrated) are formed in the surface of the pipe 30 on the radiator 14 side. Cleaning liquid within the pipe 30 is injected from these injection holes, and flows down along the surface of the radiator 14. Hence, the fluidity of extraneous substances clogging purification sites of the ozone purifying body can be enhanced and the extraneous substances can be washed away. Note that, in order to further enhance the fluidity of the extraneous substances, preferably the cleaning liquid is fed to the pipe 30 after being heated by an existing apparatus (not illustrated) of the vehicle. Alternatively, the cleaning liquid may be heated by separately heating the pipe 30.

However, in the case of adopting a pipe method as in the present embodiment, when the vehicle is travelling at a high speed there is the possibility that the cleaning liquid will not spread as far as a lower region of the radiator 14 and consequently the cleaning effect will be inadequate. The reason is that, because the radiator-passing wind velocity becomes higher when the vehicle is travelling at a high speed, the cleaning liquid supplied from the pipe 30 does not flow along the surface of the radiator 14, but instead flows out towards the rear thereof. Therefore, in the present embodiment the cleaning liquid amount that is fed through the pipe 30 is set in accordance with the radiator-passing wind velocity. FIG. 19 is a view illustrating the relation between the amount of cleaning liquid that is fed to the pipe 30 and the radiator-passing wind velocity. As shown in FIG. 19, in the present embodiment, the fed amount of cleaning liquid is increased as the radiator-passing wind velocity decreases. That is, the slower the travelling speed of the vehicle 10, the greater the amount of cleaning liquid that is fed. By this means, cleaning can be reliably performed when travelling at a low speed, while avoiding a shortage of the cleaning liquid when the vehicle is travelling at a high speed, which is a situation in which the cleaning effect is low. In the present embodiment, data in which the relationship illustrated in FIG. 19 is defined as a map is previously stored in the ECU 40. The cleaning liquid amount is set by applying the radiator-passing wind velocity that is acquired from the wind velocity meter 28 to the map.

Note that, in the above described Embodiment 4, "atmospheric air velocity acquisition means" in the above described fourteenth invention is realized by the ECU 40 determining the radiator-passing wind velocity, and "injection amount setting means" in the fourteenth invention is realized by the ECU 40 determining the cleaning liquid injection amount based on the radiator-passing wind velocity in the same step.

REFERENCE SIGNS LIST

10 Vehicle
12 Internal combustion engine
14 Radiator
16a, 16b Radiator fan
18 Radiator grille
20 Injector
20c, 20d, 20e, 20f, 20g Injection hole
21 Plate
22, 24 Ozone sensor
26 Water temperature sensor
28 Wind velocity meter
30 Pipe
40 ECU

The invention claimed is:

1. An atmosphere-cleaning device for vehicles, comprising:
 a vehicle component that is arranged at a location at which a flow path of atmospheric air is formed while a vehicle is travelling;
 an ozone purifying body that is carried by the vehicle component and that has an ozone purification function;
 remover injection means configured to inject onto the ozone purifying body a remover for removing a deterioration-causing substance that causes a deterioration in an ozone purification function; and
 a controller programmed to set an injection amount of the remover from the remover injection means using at least one of a rate of decline in an ozone purification rate based on an ozone purification rate in an initial state of the ozone purifying body, an atmospheric air velocity with respect to atmospheric air passing through the ozone purifying body, and a bed temperature of the ozone purifying body.

2. The atmosphere-cleaning device for vehicles according to claim 1, wherein the controller is further programmed to:
acquire the bed temperature, and
set the injection amount so that, the higher the bed temperature that is acquired is, the greater the injection amount becomes.

3. The atmosphere-cleaning device for vehicles according to claim 1, wherein the controller is further programmed to:
acquire the atmospheric air velocity,
set the injection amount so that, the higher the atmospheric air velocity that is acquired is, the greater the injection amount becomes.

4. The atmosphere-cleaning device for vehicles according to claim 1, wherein the controller is further programmed to:
acquire the rate of decline,
set the injection amount so that, the larger the rate of decline that is acquired is, the greater the injection amount becomes.

5. The atmosphere-cleaning device for vehicles according to claim 1, wherein:
the remover is a liquid, and
the controller is further programmed to control the remover injection means so as to divide an operation to inject the remover from the remover injection means into a main injection, and a pre-injection in which the remover is injected at a lower injection pressure than in the main injection.

6. The atmosphere-cleaning device for vehicles according to claim 5, wherein the controller is further programmed to:
acquire the rate of decline,
in a case where the rate of decline that is acquired is within a set range, increase an injection proportion of the remover at a pre-injection time and also set an interval period between the pre-injection and the main injection to a long period in accordance with the rate of decline, and in a case where the rate of decline that is acquired is lower than the set range, keep the injection proportion constant, and set the interval period to a long period in accordance with the rate of decline.

7. The atmosphere-cleaning device for vehicles according to claim 1, wherein the controller is further programmed to:
determine whether or not a predetermined stop condition relating to the vehicle is established;
acquire a travelled distance of the vehicle from a previous time the predetermined stop condition is established until a current time the predetermined stop condition is established; and
in a case where it is determined that the predetermined stop condition is established, prohibit the setting of the injection amount using the at least one of the rate of decline, the atmospheric air velocity, and the bed temperature, and set an injection amount of the remover from the remover injection means using the travelled distance of the vehicle that is acquired.

8. The atmosphere-cleaning device for vehicles according to claim 7, wherein the controller is further programmed to set the injection amount so that, the longer the travelled distance of the vehicle that is acquired is, the greater the injection amount becomes.

9. The atmosphere-cleaning device for vehicles according to claim 7, wherein the remover is a liquid;
the atmosphere-cleaning device further comprising a fan that is configured to send atmospheric air that is present at a rear of the vehicle component to a front of the vehicle component; and wherein
the controller is further programmed to control, in a case where it is determined that the predetermined stop condition is established, the fan in advance of control of the remover injection means.

10. The atmosphere-cleaning device for vehicles according to claim 1, wherein:
the remover injection means is an injector having a plurality of injection holes, and the plurality of injection holes are respectively arranged facing a plurality of regions that are previously set as regions in which a passing atmospheric air amount is large of a surface of the vehicle component.

11. The atmosphere-cleaning device for vehicles according to claim 10, wherein:
the injector comprises:
a plate that has a single injection hole and that is disposed so as to cover the plurality of injection holes, and
plate rotation means for rotating the plate so that one injection hole among the plurality of injection holes, and the single injection hole communicate per injection.

12. The atmosphere-cleaning device for vehicles according to claim 1, wherein:
the remover injection means is a plurality of injectors, and injection holes of the plurality of injectors are respectively arranged facing a plurality of regions that are previously set as regions in which a passing atmospheric air amount is large of a surface of the vehicle component.

13. The atmosphere-cleaning device for vehicles according to claim 1, wherein:
the vehicle component is a casing that is provided in a vehicle width direction, and
the remover injection means comprises piping that is extended in the vehicle width direction at an upper portion of the casing and is configured to inject the remover along a surface of the casing from the upper portion to a lower portion of the casing.

14. The atmosphere-cleaning device for vehicles according to claim 13, wherein the controller is further programmed to
acquire the atmospheric air velocity, and
set the injection amount so that, the higher the atmospheric air velocity that is acquired is, the less an injection amount of the remover from the piping becomes.

15. The atmosphere-cleaning device for vehicles according to claim 1, wherein the vehicle component is a radiator or an intercooler.

16. The atmosphere-cleaning device for vehicles according to claim 1, wherein the ozone purifying body includes a porous material.

17. The atmosphere-cleaning device for vehicles according to claim 1, wherein the remover is antifreeze or water.

* * * * *

UNITED STATES PATENT AND TRADEMARK OFFICE
CERTIFICATE OF CORRECTION

| | | |
|---|---|---|
| PATENT NO. | : 9,446,352 B2 | |
| APPLICATION NO. | : 14/442194 | |
| DATED | : September 20, 2016 | |
| INVENTOR(S) | : M. Tomimatsu et al. | |

It is certified that error appears in the above-identified patent and that said Letters Patent is hereby corrected as shown below:

In the Specification

At Column 10, Line 46, change "temperature a" to -- temperature $\alpha$ --.

At Column 11, Line 35, change "temperature a" to -- temperature $\alpha$ --.

At Column 11, Line 38, change "temperature a" to -- temperature $\alpha$ --.

At Column 11, Line 44, change "temperature a" to -- temperature $\alpha$ --.

At Column 11, Line 64, change "temperature a" to -- temperature $\alpha$ --.

At Column 11, Line 66, change "temperature a" to -- temperature $\alpha$ --.

At Column 12, Line 9, change "temperature a" to -- temperature $\alpha$ --.

At Column 16, Line 19, change "value C1" to -- value $\varepsilon_1$ --.

At Column 16, Line 34, change "value Co" to -- value $\varepsilon_0$ --.

At Column 17, Line 3, change "so, the ECU" to -- $\varepsilon_0$, the ECU --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*